April 28, 1970

T. J. PLEVYAK 3,508,603

FLUID TURBULENCE IN VAPOR-PHASE COOLING SYSTEM ENHANCED
BY FORMING OF LARGE VAPOR BUBBLES

Filed June 10, 1968

INVENTOR
T. J. PLEVYAK
BY Charles E. Graves

ATTORNEY

April 28, 1970

T. J. PLEVYAK 3,508,603

FLUID TURBULENCE IN VAPOR-PHASE COOLING SYSTEM ENHANCED
BY FORMING OF LARGE VAPOR BUBBLES

Filed June 10, 1968

United States Patent Office 3,508,603
Patented Apr. 28, 1970

3,508,603
FLUID TURBULENCE IN VAPOR-PHASE COOLING SYSTEM ENHANCED BY FORMING OF LARGE VAPOR BUBBLES
Thomas J. Plevyak, Madison, N.J., assignor to Bell Telephone Laboratories, Incorporated, Berkeley Heights, N.J., a corporation of New York
Filed June 10, 1968, Ser. No. 735,662
Int. Cl. F28d 5/00
U.S. Cl. 165—1          2 Claims

ABSTRACT OF THE DISCLOSURE

Unusually large vapor bubbles are formed in narrow horizontally-oriented slots in a vapor-phase heat exchange evaporator, the vapor bubbles communicating with a heat source and the fluid body. The large bubbles so generated substantially enhance the level of fluid turbulence and thus usefully increase the rate of heat transfer.

Field of the invention

This invention relates broadly to a method for increasing the level of turbulence in a boiling fluid for the purpose of, for example, improving the boiling heat transfer process. The method finds specific application, inter alia, in the evaporator of a vapor-phase cooling system for semiconductor devices.

Objects of the invention

To increase the level of turbulence in a boiling fluid without resort to active mechanical devices;
To enhance the flow of heat energy from a heated surface into a boiling fluid; and
To reduce the overall thermal resistance of a vapor-phase heat exchanger.

Background of the invention

In a fluid evaporation system, the flow of heat from a solid heated surface to a surrounding fluid can be enhanced by employing fluid pumps to increase the velocity of fluid convection currents, or by mechanically stirring the fluid. Apparatus of either type involves design complexities, cost increments and maintenance problems. These significant drawbacks have motivated searches for alternative mechanisms for generating the desired fluid motion in an evaporator.

One potential alternate source is the vapor bubbles themselves which in their ascent produce varying degrees of fluid motion. In typical vapor bubble-forming processes, vaporization begins on the heating surface at active nuclei which are macroscopic cavities containing adsorbed gases. The bubble grows until its own buoyancy and the flow of surrounding liquid causes it to leave the heating surface. At low heat flux levels, columns of tiny bubbles rise from the active nuclei and cause no significant turbulence. At high heat power levels, more numerous columns form consisting of somewhat larger bubbles moving at velocities high enough to cause fluid turbulence which enhances the transfer of heat.

The foregoing observations suggested to applicant the desirability of larger size vapor bubbles as agents for creating the higher rates of heat transfer through greater fluid turbulence in an evaporator. Theory, as well, would favor larger bubbles, since fluid shear is proportional to the square of bubble diameter and buoyant force on a vapor bubble is proportional to the cube of the diameter. A large vapor bubble will rise faster and causes greater motion of the surrounding fluid.

Summary of the invention

A mechanism has been discovered leading to improved boiling heat transfer which involves the presence of one or more narrow horizontally-oriented slots appropriately located on a heating surface. The slots trap a small portion of the fluid and cause the growth of exceptionally large vapor bubbles. Unexpectedly, the large bubbles are an order of magnitude greater in diameter than bubbles produced in ordinary nucleate boiling and the upward flow of these large induced vapor bubbles generates substantially more fluid motion and fluid turbulence.

In its application to evaporator units of vapor-phase cooling systems, the invention assumes the form of, for example, a narrow peripheral slot between a semiconductor mounting plug's wall and a ceramic insulating washer. In this embodiment, the slot is in the form of a cylinder whose axis is normal to the rise path of the bubbles. The principal horizontal aspect of such a slot occurs at its upper and lowermost segments. Here, large bubbles form and are released into the fluid. Other slot shapes suitable for invoking the inventive mechanism are readily envisionable.

One feature of the invention is the controlled production of unusually large vapor bubbles in horizontally-oriented chambers within which relatively little headroom is provided, the chambers being thermally connected to a heat source which may supply a very small amount of heat energy.

An important further feature of the invention is that the large vapor bubbles are produced in zones which can be thermally isolated from the main heat source.

The invention, its further objects, features, and advantages are delineated in greater detail in the description to follow of an illustrative embodiment.

Detailed description of an illustrative embodiment

Figure 1:
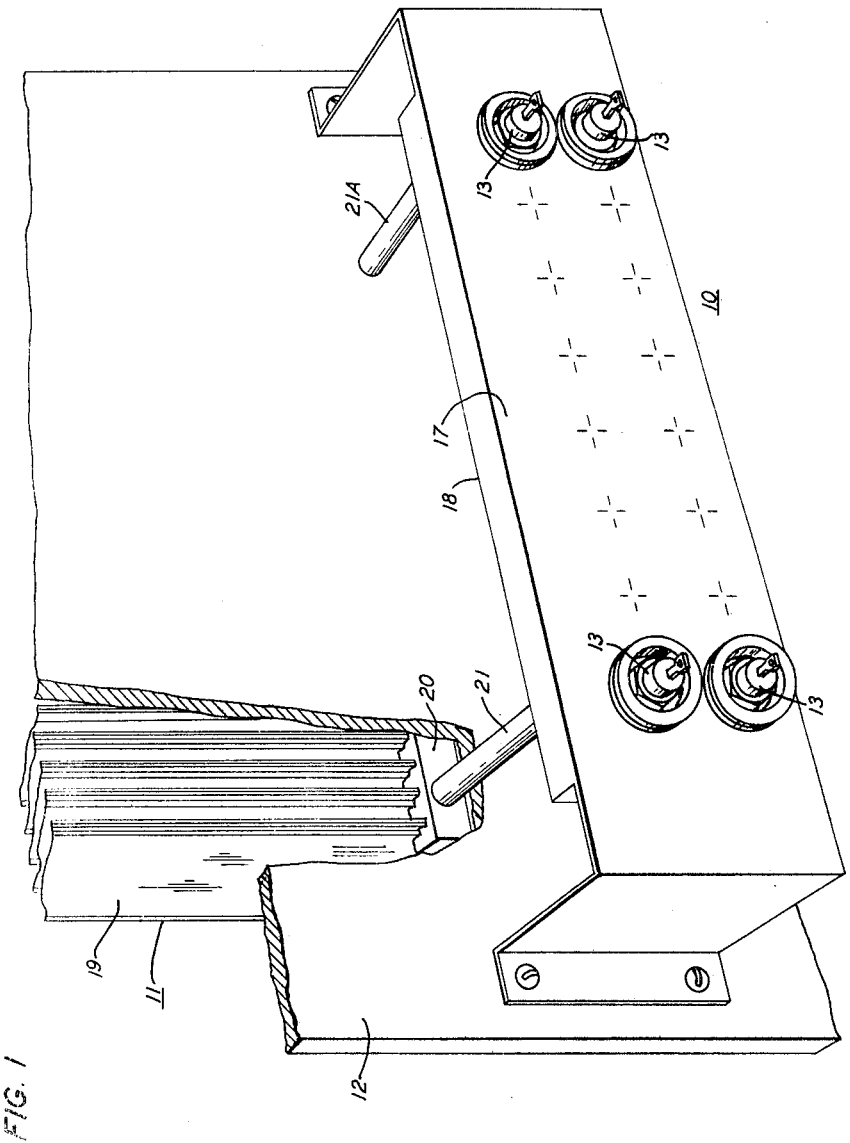
FIG. 1 is a schematic frontal perspective view of a vapor-phase cooling system.
Figure 2:
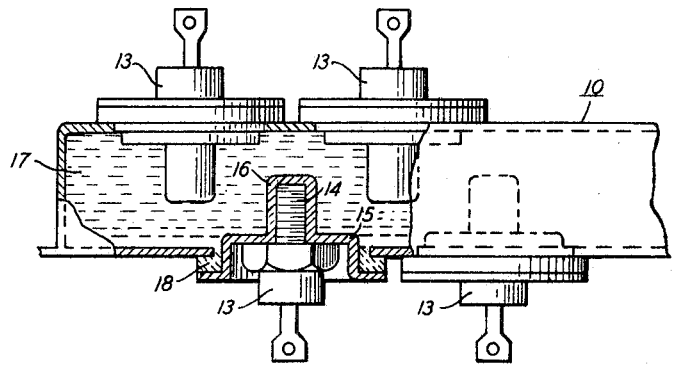
FIG. 2 is a sectional side view of an evaporator.

FIG. 1 depicts a vapor-phase cooling system substantially of the type disclosed in applicant's earlier application, Ser. No. 680,092, filed Nov. 2, 1967 and assigned to applicant's assignee. The unit consists of an evaporator 10, and a condenser 11, mounted on opposite sides of a vertical panel 12. In the evaporator 10, a heat-generating solid state component is contained in a housing 13 which is fastened to a stud 14, as shown in FIG. 2. Stud 14 threads into a mounting fixture 15 which includes an extension 16 protruding well into the body 17 of evaporator fluid. Mounting fixture 15 is keyed to evaporator 10 through a ceramic washer 18.

The condenser 11 consists of several cooling fins 19 mounted on a manifold 20 which is connected to evaporator 10 by piping such as 21, 21A.

Figure 3:
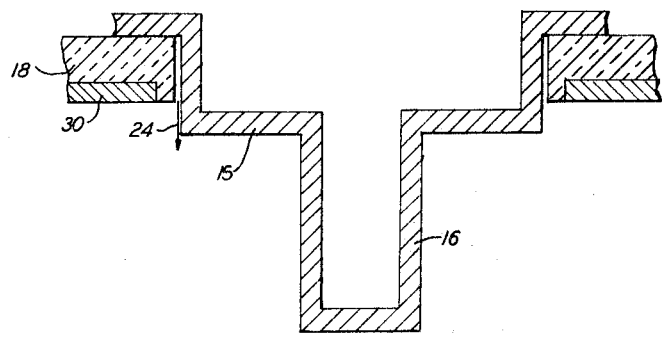
FIG. 3 is a sectional side view of a semiconductor mounting arrangement with one embodiment of the bubble-generating horizontal slot.
Figure 4:
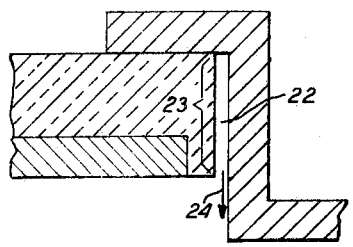
FIG. 4 is a sectional side view of the mounting plug detail of FIG. 3.

One mode of practicing the invention in the evaporator of the type depicted in FIG. 1 is illustrated in FIGS. 3 and 4. Specifically, washer 18 is selected so that a narrow peripheral slot, designated 22, exists between the washer and the exterior surface of fixture 15.

The clearance between washer 18 and fixture 15 defines the width of slot 22 which, for example, is in a range of from 0.01 inch to 0.10 inch. The length of slot 22 is substantially determined by the height 23 of the washer, and can be in the range of from 1/8 inch to 3/8 inch.

As heat is generated by the semiconductor element mounted in housing 13, vapor bubbles begin to form as above-described when the fluid reaches the boiling temperature. Bubbles forming within those areas of fixture 15 which constitute a portion of the inventive slot are momentarily trapped. Accordingly, they grow to the full width and depth of slot 23 and join with each other to form large nonspherical-shaped bubbles. They move steadily toward the free fluid 17, emerging as giant bubbles fully ten times the size of those produced in ordinary nucleate boiling.

The horizontal aspect of slot 22, and other such slots envisioned by the invention, is necessary to neutralize the buoyant force experienced by the bubble. In the embodiment above described, two horizontal aspects of slot 22 exist; one at the top and one at the bottom. The largest numbers of bubbles were here generated, but other bubbles were observed to form in the other slot segments.

Large bubbles emerging from the narrow horizontal slot are not spherical; hence, further fluid turbulence will be generated as the bubbles assume spherical form.

Figure 5:
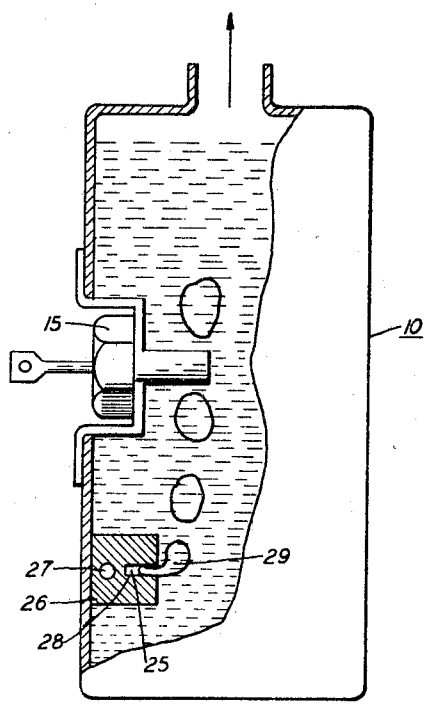
FIGS. 5 and 6 are schematic side and perspective views of a further inventive embodiment.
Figure 6:
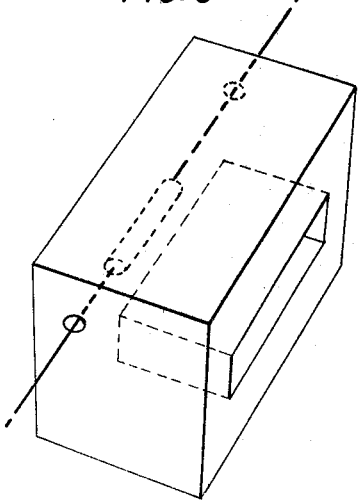

Another embodiment of the invention is depicted in FIGS. 5 and 6 which also illustrates the principle that the large vapor bubbles need not necessarily be produced in zones that are thermally coupled to the main heat source. In FIG. 5, the slot 25 is formed in a suitable housing 26 affixed in the lower region of evaporator 10, beneath the main heating surface such as 15. Slot 25 is entirely horizontal and includes a small heat source such as resistor 27 thermally connected to an interior surface of slot 25 such as wall 28. The depth of slots 25 can be about 3/16 inch, its height about 0.04 inch and width about 3/4 inch.

Vapor bubbles form on wall 28 through ordinary nucleation and grow in the slot 25 until forced out the slot's open side 29. The bubbles emerge and generate turbulence as they ascend past fixtures 15. The latter may or may not have their own large bubble generating facility. It is of note that the small quantity of heat added to generate large bubbles such as in slot 25 in evaporator 10, is offset several times over by the enhanced heat transfer rate achieved by the bubbles so created.

Experiments have indicated that a 10° F. reduction in the heat source temperature is typical of the result achieved pursuant to the invention. This effect was observed using Freon 113 as the fluid, and is large enough to be useful in the design of vapor-phase heat exchangers for semiconductor applications.

Induced vapor bubble mixing appears to be most effective for surfaces whose characteristic dimensions are of the order of several inches. For these heating surfaces, breakup and thinning of the critical thermal boundary layer is very desirable. The technique is readily applicable where the boiling fluid is part of a static heat exchange process which requires a very low overall thermal resistance from the heat source to ambient air, an increasingly critical concern in vapor-phase cooling units.

Additionally, application of the inventive heat transfer mechanism to higher viscosity fluids readily suggests uses outside the technology of electronic cooling systems. Further, where a high level of fluid turbulence is desired for reasons other than improving heat transfer, the induced vapor bubble mixing process of the present invention affords a possible answer.

It is to be understood that the embodiments described herein are merely illustrative of the principles of the invention. Various modifications may be made thereto by persons skilled in the art without departing from the spirit and scope of the invention.

What is claimed is:
1. Method for increasing the level of fluid turbulence in a confined body of fluid comprising the steps of: forming vapor bubbles in slots each having a flat horizontal roof and narrow headroom, each slot communicating with a fluid region located beneath a substantial bulk of said body, and injecting the bubbles so formed into said fluid region.

2. Method for enhancing the rate of heat transfer from a heated surface in an evaporator of a vapor-phase cooling system to the fluid within said evaporator, comprising the steps of: growing vapor bubbles in slots at the source of boiling, each slot having narrow headroom and having a roof element communicating horizontally substantially from said source to a lower region of the evaporator fluid; and releasing the bubbles into said lower region.

References Cited
UNITED STATES PATENTS

| | | | |
|---|---|---|---|
| 3,045,138 | 7/1962 | Pohl | 165—80 |
| 3,182,115 | 5/1965 | Muran et al. | |
| 3,209,062 | 9/1965 | Schulz. | |

ROBERT A. O'LEARY, Primary Examiner

C. SUKALO, Assistant Examiner

U.S. Cl. X.R.
165—80